US008756297B2

(12) United States Patent
 Jacobson

(10) Patent No.: US 8,756,297 B2
(45) Date of Patent: Jun. 17, 2014

(54) ENERGY-EFFICIENT CONTENT CACHING WITH CUSTODIAN-BASED ROUTING IN CONTENT-CENTRIC NETWORKS

(75) Inventor: Van L. Jacobson, Woodside, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 293 days.

(21) Appl. No.: 12/970,776

(22) Filed: Dec. 16, 2010

(65) Prior Publication Data

US 2012/0158912 A1    Jun. 21, 2012

(51) Int. Cl.
    *G06F 15/16* (2006.01)
(52) U.S. Cl.
    USPC .......................................... 709/219; 709/227
(58) Field of Classification Search
    USPC .......................................................... 709/219
    See application file for complete search history.

(56) References Cited

U.S. PATENT DOCUMENTS

| 2002/0078066 | A1* | 6/2002 | Robinson et al. ........... 707/104.1 |
| 2003/0074472 | A1* | 4/2003 | Lucco et al. ................. 709/245 |
| 2007/0204011 | A1* | 8/2007 | Shaver et al. ................ 709/219 |
| 2009/0287835 | A1* | 11/2009 | Jacobson ...................... 709/229 |
| 2009/0307333 | A1* | 12/2009 | Welingkar et al. ........... 709/219 |
| 2010/0088370 | A1* | 4/2010 | Wu et al. ...................... 709/203 |
| 2010/0250939 | A1* | 9/2010 | Adams et al. ................ 713/171 |
| 2011/0106755 | A1* | 5/2011 | Hao et al. ..................... 707/610 |
| 2011/0286459 | A1* | 11/2011 | Rembarz et al. ............. 370/392 |
| 2012/0136936 | A1* | 5/2012 | Quintuna ..................... 709/204 |
| 2012/0290919 | A1* | 11/2012 | Melnyk et al. ............... 715/234 |

FOREIGN PATENT DOCUMENTS

EP    2214357 A1    4/2010

OTHER PUBLICATIONS

Jacobson, Van et al. "Networking Named Content." Dec. 1-4, 2009. CoNEXT'09.*
Jacobson, Van et al. "VoCCN: Voice Over Content-Centric Networks." Dec. 1, 2009. ACM ReArch'09.*
Jacobson, Van et al., "VoCCN: Voice-over Content-Centric Networks", Dec. 2009, pp. 1-6, Retrieved from the internet: URL:http://conferences.sigcomm.org/co-next/2009/workshops/rearch/papers/jacobson.pdf (Retrieved on Mar. 7, 2012).
Jacobson, Van et al., "Networking Named Context", Dec. 2009, pp. 1-13, Retrieved from the internet: URL:http://conferences.sigcomm.org/co-next/2009/papers/jacobson.pdf (Retrieved on Mar. 6, 2012).
Wang, Jiangzhe et al., "DMND: Collecting Data from Mobiles Using Named Data", Vehicular Networking Conference, 2010 IEEE, pp. 49-56.

* cited by examiner

*Primary Examiner* — Liangche A Wang
*Assistant Examiner* — Johnny Aguiar
(74) *Attorney, Agent, or Firm* — Shun Yao; Park, Vaughan, Fleming & Dowler LLP

(57) ABSTRACT

One embodiment of the present invention provides a system for facilitating custodian-based routing. During operation, the system receives, at a computing device serving as a backup custodian to one or more mobile devices, a request for a piece of content from a requesting device, which has mapped the content to the computing device based on the content's name without using the computing device's physical address. The system determines whether the content is available on the computing device. In response to the content not being available on the computing device, the system identifies a mobile device that stores the content, and obtains the content from the identified mobile device. The system then caches the content on the computing device, thereby enabling the computing device to provide the content in response to subsequent requests without connecting to the identified mobile device, and provides the content to the requesting device.

23 Claims, 4 Drawing Sheets

ENERGY-EFFICIENT CONTENT CACHING WITH CUSTODIAN-BASED ROUTING IN CONTENT-CENTRIC NETWORKS

RELATED APPLICATION

The subject matter of this application is related to the subject matter of the following applications:
- U.S. patent application Ser. No. 12/123,344, entitled "VOICE OVER CONTENT-CENTRIC NETWORKS," by inventors Paul J. Stewart, Van L. Jacobson, Michael F. Plass, and Diana K. Smetters, filed 19 May 2008;
- U.S. patent application Ser. No. 12/332,560, entitled "METHOD AND APPARATUS FOR FACILITATING COMMUNICATION IN A CONTENT-CENTRIC NETWORK," by inventor Van L. Jacobson, filed 11 Dec. 2008;
- U.S. patent application Ser. No. 12/565,005, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009;
- U.S. patent application Ser. No. 12/603,336, entitled "ADAPTIVE MULTI-INTERFACE USE FOR CONTENT NETWORKING," by inventors Van L. Jacobson and James D. Thornton, filed 21 Oct. 2009;
- U.S. patent application Ser. No. 12/638,478 entitled "SYSTEM FOR FORWARDING PACKETS WITH HIERARCHICALLY STRUCTURED VARIABLE-LENGTH IDENTIFIERS USING AN EXACT-MATCH LOOKUP ENGINE," by inventors Van L. Jacobson and James D. Thornton, filed 15 Dec. 2009;
- U.S. patent application Ser. No. 12/640,968, entitled "METHOD AND SYSTEM FOR FACILITATING FORWARDING A PACKET IN A CONTENT-CENTRIC NETWORK," by inventors Van L. Jacobson and James D. Thornton, filed 17 Dec. 2009;
- U.S. patent application Ser. No. 12/765,645, entitled "SESSION MIGRATION OVER CONTENT-CENTRIC NETWORKS," by inventors James D. Thornton, Van L. Jacobson, and Diana K. Smetters, filed 22 Apr. 2010;
- U.S. patent application Ser. No. 12/852,302, entitled "SERVICE VIRTUALIZATION OVER CONTENT-CENTRIC NETWORKS," by inventors James D. Thornton, Van L. Jacobson, and Diana K. Smetters, filed 6 Aug. 2010; and
- U.S. patent application Ser. No. 12/970,740, entitled "CUSTODIAN-BASED ROUTING IN CONTENT-CENTRIC NETWORKS," by inventors Van L. Jacobson and Marc Mosko, filed 16 Dec. 2010;

the disclosures of which are incorporated by reference in their entirety herein.

FIELD

The present disclosure relates generally to content routing in content-centric networks. More specifically, the present disclosure relates to energy-efficient content caching with custodian routing in content-centric networks (CCNs).

RELATED ART

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. That is, a consumer of data can only receive the data by explicitly requesting the data from an address (e.g., an IP address) closely associated with a physical object or location. This restrictive addressing scheme is becoming progressively more inadequate for meeting ever-changing network demands.

The current architecture of the Internet revolves around a conversation model, which was created in the 1970s for the ARPAnet to allow geographically distributed users to use a few big, immobile computers. This architecture was designed under the influence of the telephone network, where a telephone number is essentially a program that configures the switches along a path from the source to the destination. Not surprisingly, the designers of the ARPAnet never expected it to evolve into today's ubiquitous, relentlessly growing Internet. People now expect a lot more from the Internet than the ARPAnet was designed to provide. Ideally, an Internet user should have access to any content, anywhere, at any time—access that is difficult to facilitate with the current location/device-binding TCP/IP (transmission control protocol/Internet protocol) networks.

Content-centric networks (CCN), also referred to as "content-based networks," bring a new approach to data transport in a network. Instead of having network traffic viewed at the application level as end-to-end conversations over which content travels, content is requested or returned based on the name given to it, and the network is responsible for routing data, or "content," from the provider to the consumer.

SUMMARY

One embodiment of the present invention provides a system for facilitating custodian-based routing. During operation, the system receives, at a computing device serving as a backup custodian to one or more mobile devices, a request for a piece of content from a requesting device, which has mapped the content to the computing device based on the content's name without using the computing device's physical address. The system determines whether the content is available on the computing device. In response to the content not being available on the computing device, the system identifies a mobile device that stores the content, and obtains the content from the identified mobile device. The system then caches the content on the computing device, thereby enabling the computing device to provide the content in response to subsequent requests without connecting to the identified mobile device, and provides the content to the requesting device.

In one variation on this embodiment, the computing device, the requesting device, and the mobile devices are coupled to a content-centric network (CCN).

In one variation on this embodiment, identifying the mobile device that stores the content involves performing a lookup based on the content's name, and the content name comprises a number of components of variable lengths.

In one variation on this embodiment, the content stored on the mobile device is mapped to the backup custodian, regardless of whether the backup custodian stores the content or not.

In one variation on this embodiment, connections from devices other than the backup custodian to the identified mobile device are prohibited.

In one variation on this embodiment, the computing device receives the request for the content based on a preference level of the computing device being higher than a preference level of the mobile device storing the content.

In one variation on this embodiment, obtaining the content from the identified mobile device includes identifying a communication endpoint located on the mobile device and establishing a connection to the identified communication endpoint.

In a further variation, the communication endpoint includes one of: a WiFi interface, a cellular interface, and a Bluetooth interface.

In a further variation, establishing a connection to the identified communication endpoint involves using session initiation protocol (SIP).

BRIEF DESCRIPTION OF THE FIGURES

In the figures, like reference numerals refer to the same figure elements.

DETAILED DESCRIPTION

Figure 1:
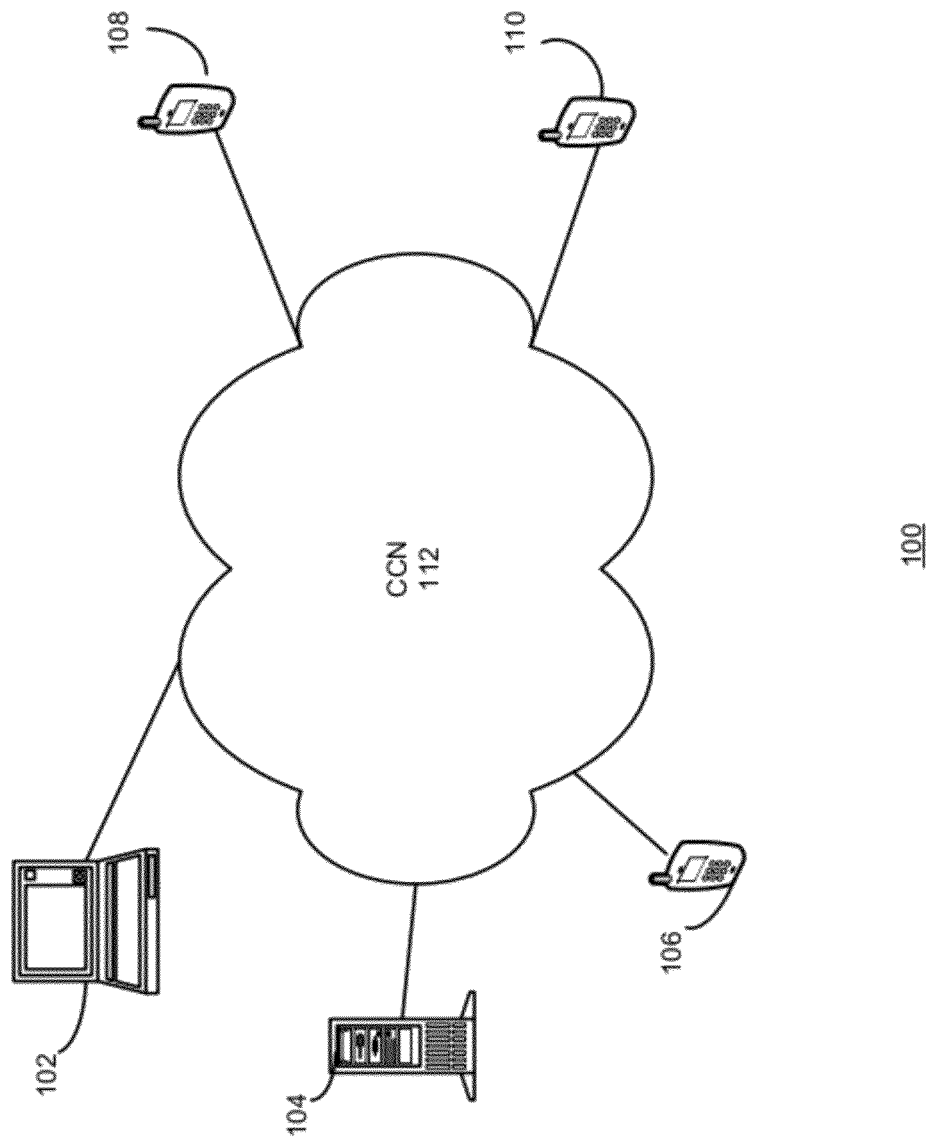
FIG. 1 presents a diagram illustrating the exemplary architecture of a CCN-based content-delivery network (CDN) with a mobile device and its backup custodian in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a solution for energy-efficient content caching with custodian-based routing in CCNs. In a CCN environment that implements custodian-based routing, content is associated with a custodian, and requests for contents are routed to the custodian of the content. To reduce energy consumption of a mobile device, frequent content requests to the mobile device can be handled by an assigned backup custodian, which can be a stationary device with little or no power constraints. All content stored on the mobile device can be mapped to the backup custodian during the content-prefix-to-custodian mapping even though the backup custodian does not contain all the content. When a remote device requests a piece of content stored on the mobile device, that request is directed to the backup custodian based on the content-prefix-to-custodian mapping. If the backup custodian does not have a copy of the requested content, it will request a copy from the mobile device and cache that copy in order to fulfill future requests from other remote devices.

Although the instant disclosure is presented using examples based on the CCN, embodiments of the present invention are not limited to the CCN.

The term "custodian" refers to a device that stores the content corresponding to interest. A custodian can be any type of device that is capable of storing data in volatile or non-volatile storage. A custodian can be a mobile computing device, such as a laptop computer, a tablet or slate computer, a smartphone, or a personal digital assistant (PDA), or a stationary computing device, such as a desktop computer or a home media server.

The term "communication endpoint" refers to a communication interface located on a computing device, through which a remote device can communicate with the computing device. A "communication endpoint" can be any type of communication interface, including, but not limited to, a WiFi™ (trademark of the Wi-Fi Alliance) interface, a 3G cellular interface, and a Bluetooth™ (trademark of the Bluetooth Special Interest Group of Kirkland, Wash.) interface.

Content-Centric Network

CCN names can include an explicitly specified number of components. In addition, CCN names are persistent and content-specific. That is, if a user changes the content of a file or data object, the modified content is effectively associated with a new name. This persistency can be achieved with an explicit versioning mechanism, where, for example, the new content can be "version 4" of a given name. The version is often a timestamp. The persistency can also be achieved implicitly. For example, contents can be associated with not only their human-established names, but also with authentication metadata (e.g., a digital signature by the publisher of the content). As a result, the complete content name changes when the data associated with a given name changes.

In a content-centric network (CCN), communication is driven by the consumers of data. In a CCN, there are two packet types, interest and data. An interest packet (also called a query) is a request for some content. An interest packet encodes a special form of query that indicates the desired content. A data packet (also called a content packet) is a unit of content. Data packets are self-identifying by carrying within them their full name. A consumer can ask for content by broadcasting its interest over all available connectivity. Any node hearing the interest and having data that satisfies it can respond with one or more data packets. Data is transmitted only in response to an interest and consumes that interest. Both interest and data identify the content being exchanged by the content name (or CCN name). In one embodiment, data can "satisfy" an interest if the CCN name in the interest packet is a prefix of the CCN name in the data packet. An interest may specify the exact version to retrieve or may specify any version greater than a specified version, known as a "get-the-latest-version interest."

Functionally, a CCN can retain associations between various names and the content which they represent. The names are hierarchically structured, have variable length, and in many situations can be understood by a user. For example, "/abcd/bob/papers/ccn/news" could be the name of an article, i.e., the "news" article from the "ccn" collection of papers for a user named "Bob" at the organization named "ABCD." In a CCN, from an application's perspective, there is no need for a content consumer to determine how to find the "ABCD" organization, or to find which host there holds Bob's CCN publications. In one embodiment, to request a piece of content, a device in the CCN registers with the network that it is interested in that content by its name, and the content, if available in the local network, is routed back to it. The routing infrastructure takes care of intelligently propagating the interest to the prospective publishers, and then carrying any available content back along the path which the interest traversed.

CCNs have additional properties which make them especially appealing. All content can be cryptographically authenticated, meaning that some subset of nodes on the network (e.g., a legitimate querier of the content) can verify the authenticity of a piece of content. CCNs also allow data to be accessed by name, independent of publisher. At the same time, one can tailor a specialized request for data by a certain publisher. For example, one can ask for "foo.txt," or "foo.txt signed by Bob." Any form of self-verifying name can be used as a contract between producer and consumer. It is also possible to use hybrid self-verifying names, where the former components of the name are for organization and efficient routing, and the latter components of the name are self-verifying. Finally, CCNs allow the separation of content and trust, enabling different data consumers to use different mechanisms for establishing trust in the same piece of content. Although content might have been signed by a single publisher, it can be trusted for different reasons. For example, one user might trust a given piece of content because of a direct personal connection with its signer, whereas another user might trust the same content because of the content signer's participation in a Public Key Infrastructure (PKI) which that user has chosen to trust.

Custodian-Based Routing

To enable content sharing among various user devices within a social network group, custodian-based routing can be implemented over a CCN-based content delivery network (CDN) that includes various user devices. In a CDN implementing custodian-based routing, content is associated with devices storing it, called custodians. A request for a particular piece of content can always be routed to its custodian, regardless of the physical location of the custodian.

To ensure that the requesting party of a piece of content can correctly connect to the custodian of that content, the CCN-based CDN maintains three different types of mapping, including content-prefix-to-custodian mapping, custodian-to-communication-endpoint mapping, and communication-endpoint-to-physical-address mapping. Each time a device interacts with another device, the devices exchange the three types of mapping information with each other to make sure that the routing information is distributed across the CCN. Alternatively, the communication-endpoint-to-physical-address mapping information can be stored at a third-party service, such as a public session initiation protocol (SIP) server which provides rendezvous service between the requesting party and the custodian.

Details about custodian-based routing can be found in U.S. patent application Ser. No. 12/970,740, entitled "CUSTODIAN-BASED ROUTING IN CONTENT-CENTRIC NETWORKS," by inventors James D. Thornton, Van L. Jacobson, and Marc Mosko, filed TBD, the disclosure of which is incorporated by reference in their entirety herein.

Content Caching for Energy Efficiency

In custodian-based routing, a content custodian is responsible for providing content to other requesting devices. However, for an energy-constrained mobile device, such as a battery-powered mobile phone, answering frequent requests for its stored content may result in rapid draining of its battery power. For example, a user takes a video with his mobile phone and notifies all his family members that he would like to share the video with them. Consequently, all his family members will try to connect to his phone and download the video file. Because a significant amount of power can be consumed each time the file is downloaded, the multiple downloading attempts can cause the user's mobile phone to run out of power quickly.

To address such an issue, embodiments of the present invention allow a mobile device to delegate the task of content distribution to a stationary device that is not power constrained as its backup custodian. Content stored on the mobile device is mapped to both the mobile device and the backup custodian with different preference settings in the content-prefix-to-custodian mapping table, regardless of whether such content is physically stored on the backup custodian.

FIG. 1 presents a diagram illustrating the exemplary architecture of a CCN-based CDN with a mobile device and its backup custodian in accordance with an embodiment of the present invention. CDN 100 includes a number of devices, such as a laptop computer 102, a media server 104, and smartphones 106-110, coupled to each other via a CCN 112.

To avoid battery drainage due to frequent content requests, smartphone 106 designates media server 104, which is coupled to an alternating current (AC) power source, as its backup custodian by mapping its stored content to media server 104, in addition to smartphone 106. As a result, each piece of content stored on smartphone 106 has at least two custodians, smartphone 106 and media server 104. To facilitate this configuration, smartphone 106 first notifies media server 104 the namespace prefixes for which media server 104 needs to provide backup service. For example, smartphone 106 may wish media server 104 to be the backup for all its videos, but not photos. Accordingly, smartphone 106 sends namespace prefix "/Bob cell/video" to media server 104. Such a notification can be sent to media server 104 over CCN or other communication channels. In addition, smartphone 104 notifies media server 104 the preference of the prefix-to-custodian entries (PCEs) that map the namespace prefixes to smartphone 106. Upon receiving the namespace prefixes, media server 104 generates PCEs that map the namespace prefixes to media server 104. To make sure that media server 104 is contacted before smartphone 106, the PCEs mapped to media server 104 are configured to have a higher preference than the PCEs mapped to smartphone 106. Note that the device with the higher preference has a higher connection priority. As a result, any request for content under these namespace is directed first to media server 104, which is not power constrained and thus able to handle frequent content requests. Alternatively, to ensure that content requests are directed to media server 104, smartphone 106 can specify that media server 104 is the only device that is allowed to connect to smartphone 106. To do so, in one embodiment, the entry in the custodian-to-endpoint mapping table corresponding to smartphone 106 includes restriction entries that specify which device is allowed to connect. These restrictions are included in the EndpointAttribute entry (EAE), for all endpoints associated with smartphone 106. In one embodiment, the restriction entries specify that no device is allowed to connect to smartphone 106 other than media server 104.

When smartphone 108 tries to obtain a piece of content stored on smartphone 106, it performs a lookup in the content-prefix-to-custodian mapping information. The lookup result identifies that the backup custodian for smartphone 106, i.e., media server 104, is the custodian for the requested content. Note that when performing the lookup, smartphone 108 does not need to know the physical address of media server 104. Accordingly, smartphone 108 establishes a connection to media server 104 instead of to smartphone 106 to request the content. When media server 104 receives the content request, it determines whether it has a copy of such content. If so, media server 104 provides the requested content to smartphone 108. Otherwise, media server 104 determines which device actually stores the requested content. Aware of itself as the backup custodian of smartphone 106, media server 104 can assume that the absent content is stored on smartphone 106. Alternatively, media server 104 can perform a lookup on its content-prefix-to-custodian mapping information to locate the actual content custodian.

Once smartphone 106 is identified as the actual device storing the requested content, media server 104 connects to smartphone 106 to obtain the requested content. Because custodian-based routing maintains custodian-to-communication-endpoint mapping as well as custodian-endpoint-to-physical-address mapping, media server 104 is able to establish a connection with smartphone 106 regardless of the physical location of smartphone 106. Note that, if media server 104 and smartphone 106 are both connected to the same WiFi network, media server 104 can connect to smartphone 106 directly via the WiFi network. Otherwise, other types of communication channels, such as a peer-to-peer tunnel negotiated by session initiation protocol (SIP), may be needed to connect media server 104 with smartphone 106. Upon receiving the content from smartphone 106, media server 104 stores a copy of the content in its local cache, and then passes the content to smartphone 108. Later on, when other remote devices, such as smartphone 110, request the same content, media server 104 can provide them with the cached content instead of having to connect to smartphone 106 again. In this way, multiple remote devices are able to obtain content stored on smartphone 106 without multiple connections to smartphone 106, thus avoiding battery drainage of smartphone 106.

Figure 2:
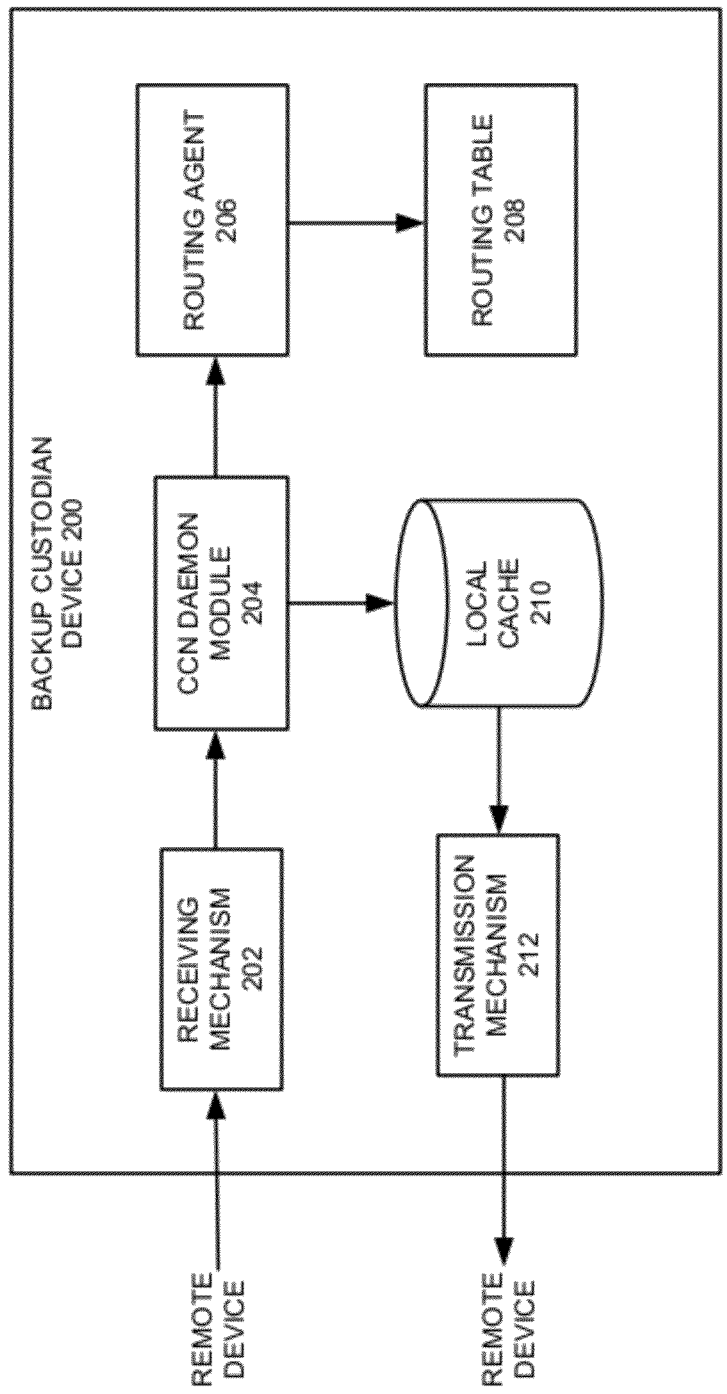
FIG. 2 presents a diagram illustrating the architecture of an exemplary backup custodian device in accordance with an embodiment of the present invention.

FIG. 2 presents a diagram illustrating the architecture of an exemplary backup custodian device in accordance with an embodiment of the present invention. Backup custodian device 200 includes receiving mechanism 202, a CCN daemon module 204, a routing agent 206, a routing table 208, a local cache 210, and a transmission mechanism 212.

During operation, receiving mechanism 202 receives a request from a remote device for certain content. Note that the remote device has identified backup custodian device 200 as the custodian of the content. Receiving mechanism 202 passes the received request to CCN daemon module 204 which is configured to run a background process for the CCN. CCN daemon module 204 checks local cache 210 to determine whether the content is available locally. If so, transmitting mechanism 212 transmits the requested content to the requesting remote device. If not, CCN daemon module 204 contacts routing agent 206 to obtain routing information in order to determine the actual custodian storing the requested content. In one embodiment, routing agent 206 obtains the routing information, which includes the content-prefix-to-custodian mapping, from routing table 208. In a further embodiment, routing table 208 stored on backup custodian device 200 is different from the routing table distributed among other CCN devices. In the routing table distributed among other CCN devices, backup custodian device 200 is specified as the custodian for all content stored in a mobile device backed up by backup custodian device 200, regardless of whether that contents is physically located on backup custodian device 200 or not. In contrast, routing table 208 stored on backup custodian device 200 maps the mobile device as the actual custodian of that content.

Once the actual custodian of the content is identified, backup custodian device 200 can establish a connection with the actual custodian and obtain the requested content. Backup custodian device 200 makes a copy of the requested content and stores this copy in local cache 210. Afterwards, transmission mechanism 212 transmits the requested content to the remote device.

Figure 3:
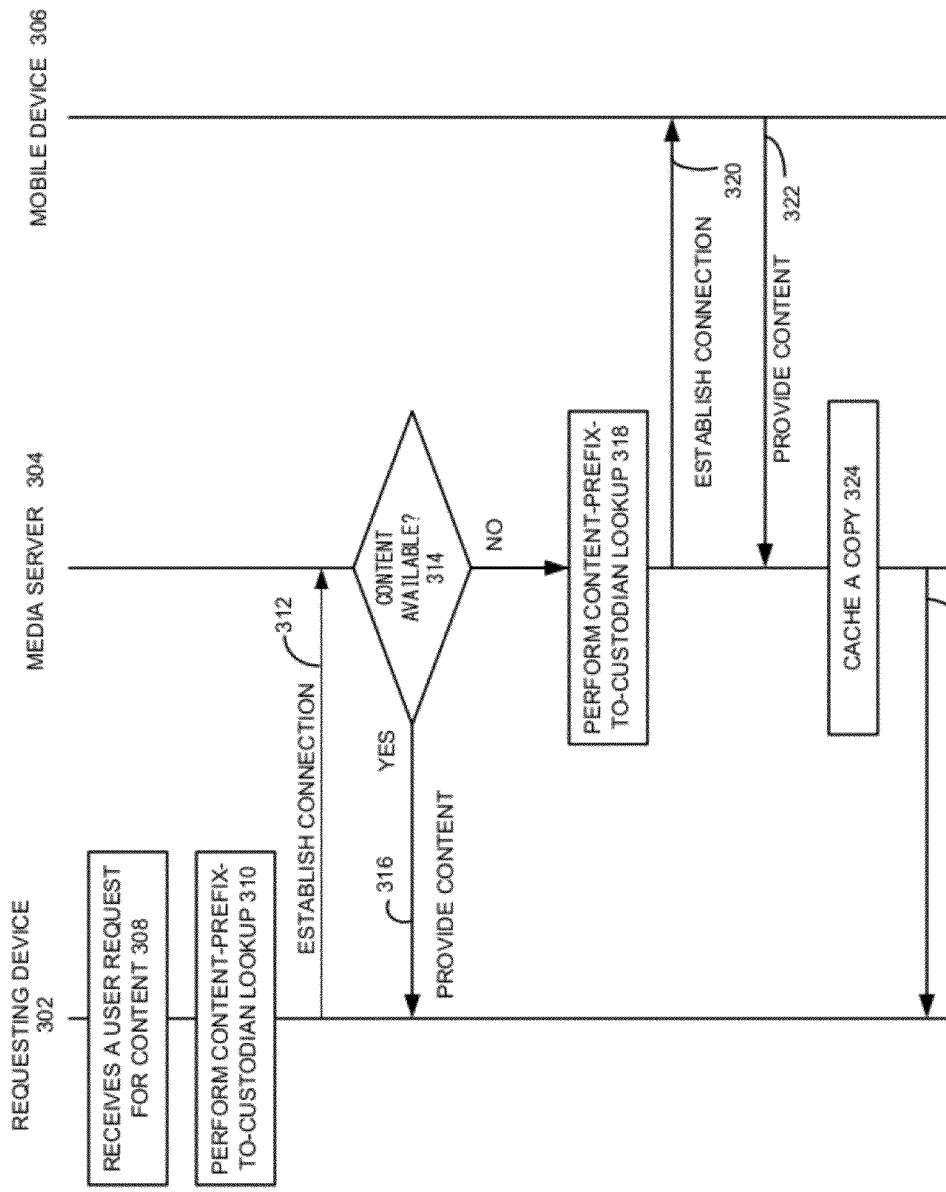
FIG. 3 presents a time-space diagram illustrating the process of a remote device obtaining content stored on a mobile device in accordance with an embodiment of the present invention.

FIG. 3 presents a time-space diagram illustrating the process of a remote device obtaining content stored on a mobile device in accordance with an embodiment of the present invention. During operation, a requesting device 302 receives a request from its user for a piece of content that is not available locally (operation 308). Upon receiving the request, requesting device 302 performs a content-prefix-to-custodian lookup to determine the custodian of the content (operation 310). In one embodiment, the lookup result indicates that the custodian with the highest preference for the requested content is a media server 304, which is the backup custodian for mobile device 306. In a further embodiment, the lookup result indicates that the only content custodian that allows requesting device 302 to establish a connection is media server 304. Based on the lookup result, requesting device 302 connects to media server 304 to request the content (operation 312).

Upon receiving the content request, media server 304 determines whether it actually has a copy of such content (operation 314). If so, media server 304 provides the requested content to requesting device 302 (operation 316). Otherwise, media server 304 identifies the actual custodian of the requested content (operation 318). In one embodiment, media server 304 performs a content-prefix-to-custodian lookup to identify the actual custodian. Note that media server 304 can serve as a backup custodian for multiple mobile devices. By performing the content-prefix-to-custodian lookup, media server 304 can find out which mobile device actually stores the requested content. In one embodiment, media server 304 maintains a content-prefix-to-custodian mapping table which maps the content-prefix to the actual custodian of the content.

Once media server 304 identifies that mobile device 306 stores the requested content, it establishes a connection with mobile device 306 to request the content (operation 320). In one embodiment, media server 304 establishes a connection to mobile device 306 by performing a custodian-to-communication-endpoint lookup and a communication-endpoint-to-physical-address lookup. The custodian-to-communication-endpoint mapping information provides a mapping between a custodian and the endpoint that enables potential paths to the given custodian. In one embodiment, the custodian-to-communication-endpoint mapping information is included in a custodian-to-communication-endpoint mapping table that is exchanged between devices within the CCN. In the custodian-to-communication-endpoint mapping table, each device within the CCN has a corresponding entry, which includes an array of Custodian Endpoint Entries (CEEs) corresponding to all the endpoints belonging to the device. For example, the entry corresponding to mobile device 306 may include a WiFi interface, a cellular 3G interface, and a Bluetooth interface. A CEE corresponding to an endpoint can also include an EndpointAttribute (EAE) component, which can be used to specify which devices are allowed to obtain a piece of content from the endpoint. Mobile device 306 can use the EAE component to specify that media server 304 is the only device allowed to connect to any of its endpoints.

The communication-endpoint-to-physical-address mapping provides information needed for the rendezvous between devices. Such mapping information can be stored within the custodian-to-communication-endpoint mapping table, or it can be stored in a third-party service, such as a public SIP server, which provides the rendezvous service. For example, mobile device 306 can register its SIP address with a public SIP server.

After establishment of the connection, mobile device 306 provides the requested content to media server 304 (operation 322). Upon receiving the content, media server 304 caches a copy of the content (operation 324), and provides the content to requesting device 302 (operation 326).

By caching the content originally stored on mobile device 306 on media server 304, media server 304 can serve subsequent requests for the same content from other remote devices. As a result, mobile device 306 only needs to distribute the desired content once, thus providing an energy-efficient way of content sharing.

Computer and Communication System

Figure 4:
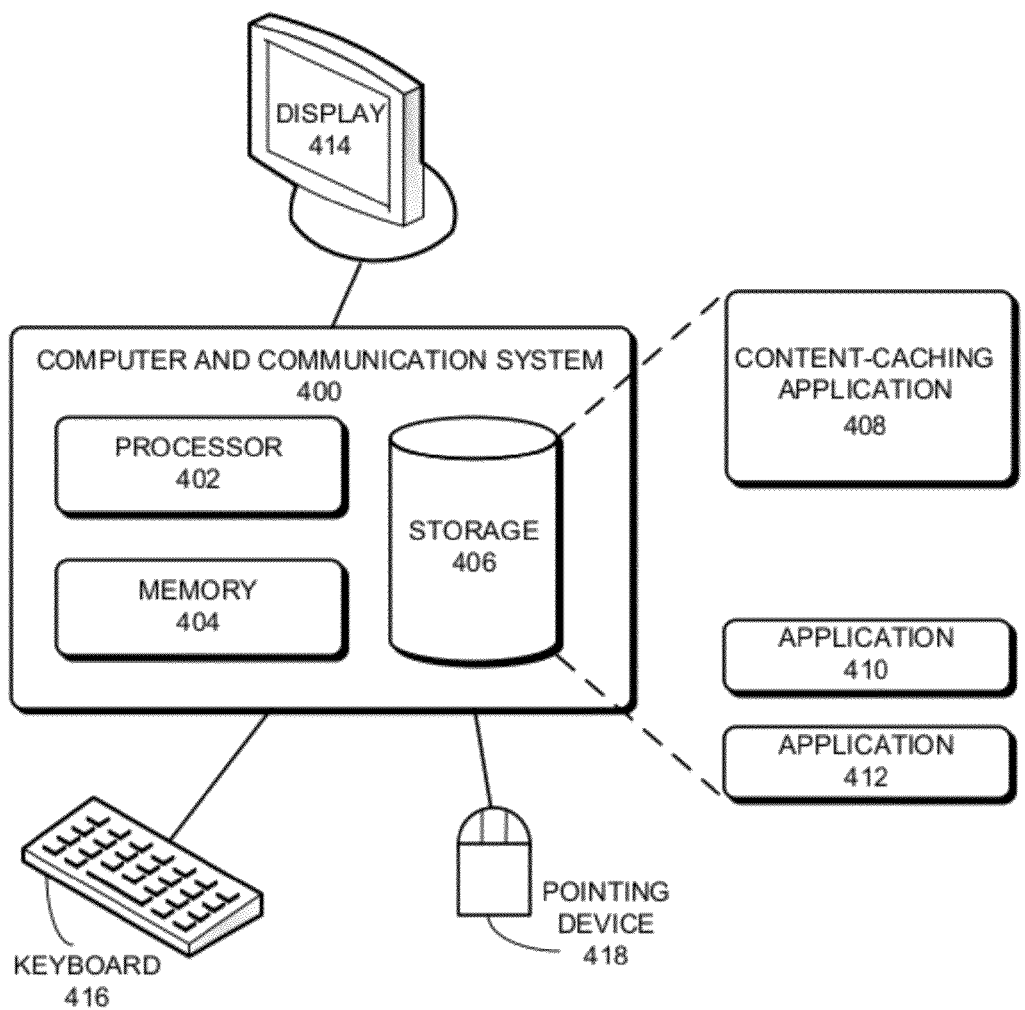
FIG. 4 presents an exemplary computer system for facilitating energy-efficient content caching with custodian-based routing over a CCN in accordance with an embodiment of the present invention.

FIG. 4 presents an exemplary computer system for facilitating energy-efficient content caching with custodian-based routing over a CCN in accordance with an embodiment of the present invention. In FIG. 4, a computer and communication system 400 includes a processor 402, a memory 404, and a storage device 406. Storage device 406 stores programs to be executed by processor 402. Specifically, storage device 406 stores a content-caching application 408, as well as other applications, such as applications 410 and 412. During operation, content-caching application 408 is loaded from storage device 406 into memory 404 and then executed by processor 402. While executing the program, processor 402 performs the aforementioned functions. Computer and communication system 400 is coupled to an optional display 414, keyboard 416, and pointing device 418.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:
   receiving, by a computing device serving as a backup custodian to one or more mobile devices, a request for a piece of content from a requesting device, based on a preference level of the computing device being higher than a preference level of a mobile device storing the content, wherein the request identifies the content by name without using the computing device's network address;
   determining whether the content is available on the computing device;
   in response to the content not being available on the computing device:
      performing a lookup in a content-prefix-to-custodian mapping to identify a mobile device that stores the content;
      performing a custodian-to-communication-endpoint lookup and a communication-endpoint-to-network-address lookup to determine a network address for the content;
      verifying that the computing device satisfies one or more conditions for accessing a namespace specified by the content name's prefix, wherein the namespace is associated with the mobile device's communication endpoint; and
      sending a request to the identified mobile device to obtain the content from the identified mobile device;
   responsive to receiving the content from the identified mobile device, caching the content on the computing device to facilitate providing the content in response to subsequent requests without connecting to the identified mobile device; and
   providing the content to the requesting device.

2. The method of claim 1, wherein the computing device, the requesting device, and the mobile devices are coupled to a content-centric network (CCN).

3. The method of claim 1, wherein performing the content-prefix-to-custodian lookup involves performing the lookup based on the content's name, wherein the content name comprises a number of components of variable lengths.

4. The method of claim 1, further comprising mapping content stored on the mobile device to the backup custodian regardless of whether the backup custodian stores that content or not.

5. The method of claim 1, further comprising prohibiting connections with the mobile device storing the content from devices other than the backup custodian.

6. The method of claim 1, wherein obtaining the content from the identified mobile device comprising identifying a communication endpoint located on the mobile device and establishing a connection to the identified communication endpoint.

7. The method of claim 6, wherein the communication endpoint includes one of:
   a WiFi interface;
   a cellular interface; and
   a Bluetooth interface.

8. The method of claim 6, wherein establishing a connection to the identified communication endpoint involves using session initiation protocol (SIP).

9. A non-transitory computer-readable storage medium storing instructions that when executed by a computer cause the computer to perform a method, the method comprising:
   receiving a request for a piece of content from a requesting device that indicates the content by name, based on a preference level of the computing device being higher than a preference level of a mobile device storing the content, wherein the request identifies the content by name without using the local repository's network address;
   determining whether the content is available on the local repository which serves as a backup custodian to one or more mobile devices;
   in response to the content not being available on the local repository, performing, by the local repository, a lookup in a content-prefix-to-custodian mapping to identify a mobile device that stores the content;
performing a custodian-to-communication-endpoint lookup and a communication-endpoint-to-network-address lookup to determine a network address for the content;
verifying that the computing device satisfies one or more conditions for accessing a namespace specified by the content name's prefix, wherein the namespace is associated with the mobile device's communication endpoint;
sending a request to the identified mobile device to obtain the content from the identified mobile device;
responsive to receiving the content from the identified mobile device, caching the content in the local repository to facilitate providing the content in response to subsequent requests without connecting to the identified mobile device; and
providing the content to the requesting device.

10. The computer-readable storage medium of claim 9, wherein the local repository, the requesting device, and the mobile devices are coupled to a content-centric network (CCN).

11. The computer-readable storage medium of claim 9, wherein performing the content-prefix-to-custodian lookup involves performing the lookup based on the content's name, wherein the content name comprises a number of components of variable lengths.

12. The computer-readable storage medium of claim 9, wherein the method further comprising mapping content stored on the mobile device to the backup custodian regardless of whether the backup custodian stores that content or not.

13. The computer-readable storage medium of claim 9, wherein obtaining the content from the identified mobile device comprises identifying a communication endpoint located on the mobile device and establishing a connection to the identified communication endpoint.

14. The computer-readable storage medium of claim 13, wherein the communication endpoint includes one of:
a WiFi interface;
a cellular interface; and
a Bluetooth interface.

15. The computer-readable storage medium of claim 13, wherein identifying the communication endpoint involves determining a preference level of the communication endpoint.

16. A computing device, comprising:
a receiving device to receive a request for a piece of content from a requesting device that indicates the content by name, based on a preference level of the computing device being higher than a preference level of a mobile device storing the content, wherein the computing device serves as a backup custodian to one or more mobile devices, and wherein the request identifies the content by name without using the computing device's network address;
a determining device to determine whether the content is available on the computing device;
a routing agent, in response to the content not being available on the computing device, configured to perform a lookup in a content-prefix-to-custodian mapping to identify a mobile device that stores the content;
a lookup agent to perform a custodian-to-communication-endpoint lookup and a communication-endpoint-to-network-address lookup to determine a network address for the content;
a verification agent to verify that the computing device satisfies one or more conditions for accessing a namespace specified by the content name's prefix, wherein the namespace is associated with the mobile device's communication endpoint;
a request-generating device to generate a request to obtain the content from the identified mobile device ;
a content-caching device to send the request to the identified mobile device to obtain the content from the identified mobile device, and to cache the content responsive to receiving the content from the identified mobile device, which facilitates providing the content in response to subsequent requests without connecting to the identified mobile device; and
a transmission device to provide the content to the requesting device.

17. The computing device of claim 16, wherein the computing device, the requesting device, and the mobile devices are coupled to a content-centric network (CCN).

18. The computing device of claim 16, wherein performing the content-prefix-to-custodian lookup involves performing the lookup based on the content's name, wherein the content name comprises a number of components of variable lengths.

19. The computing device of claim 16, wherein the content stored on the mobile device is mapped to the computing device regardless of whether the computing device stores that content or not.

20. The computing device of claim 16, wherein the identified mobile device prohibits connections from devices other than the backup custodian.

21. The computing device of claim 16, wherein the content-caching device obtains the content from the identified mobile device by identifying a communication endpoint located on the mobile device and establishing a connection to the identified communication endpoint.

22. The computing device of claim 21, wherein the communication endpoint includes one of:
a WiFi interface;
a cellular interface; and
a Bluetooth interface.

23. The computing device of claim 21, wherein the content-caching device establishes a connection to the identified communication endpoint using a session initiation protocol (SIP).

* * * * *